May 26, 1970     H. KOCHALSKI ET AL     3,513,619

APPARATUS FOR ARRAYING CIGARETTES OR THE LIKE

Filed July 13, 1967     8 Sheets-Sheet 1

INVENTORS.
BY Horst Kochalski
Ulrich Bornflett

Michael J. Striker
Attorney

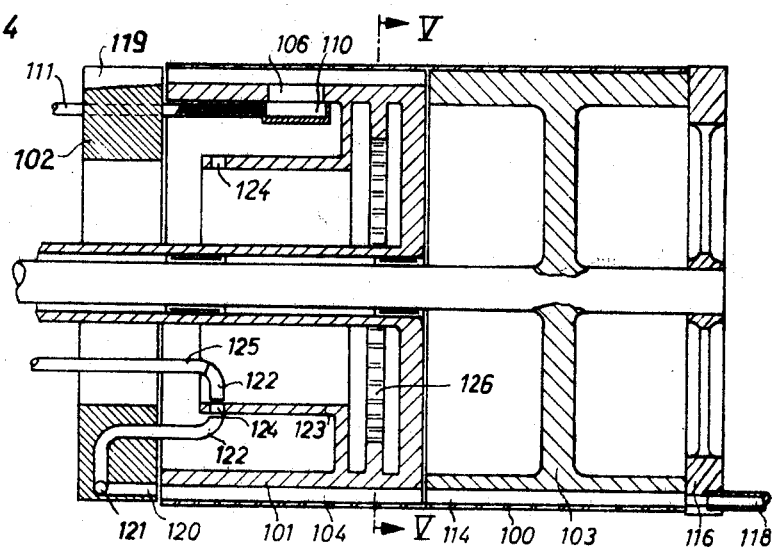
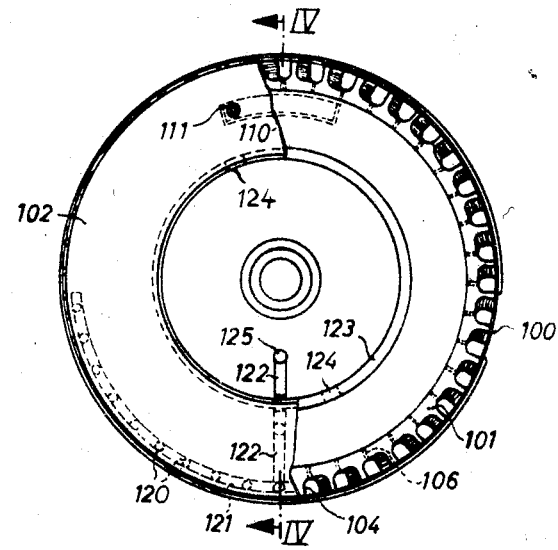
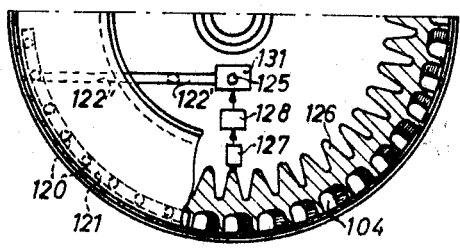

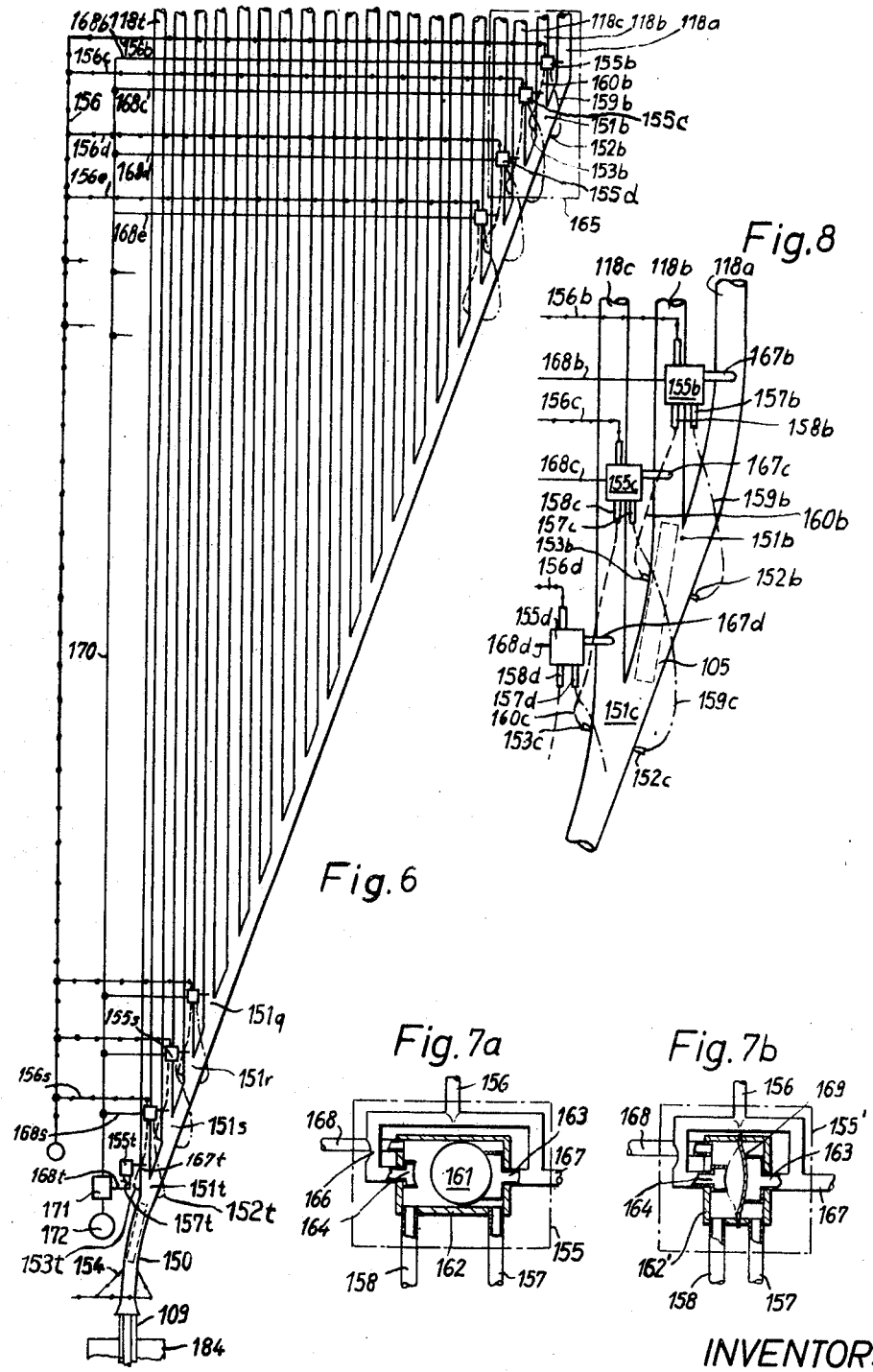

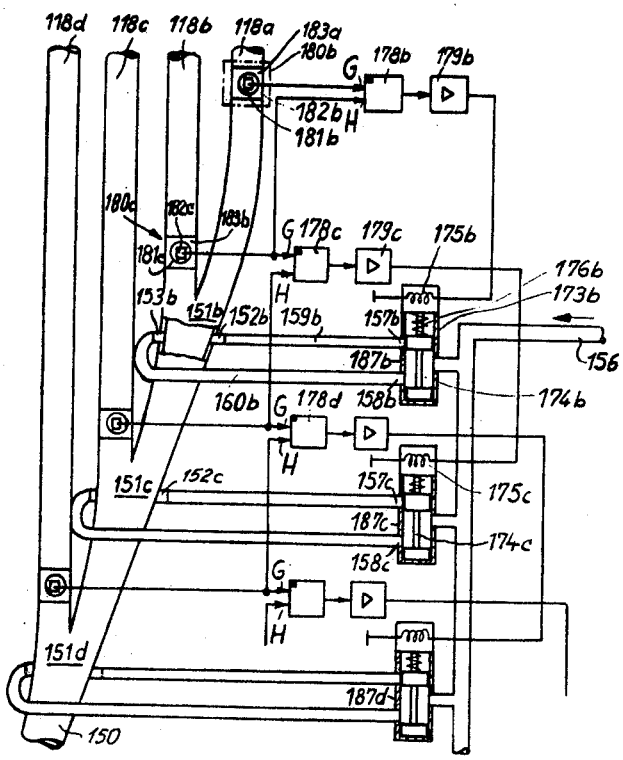
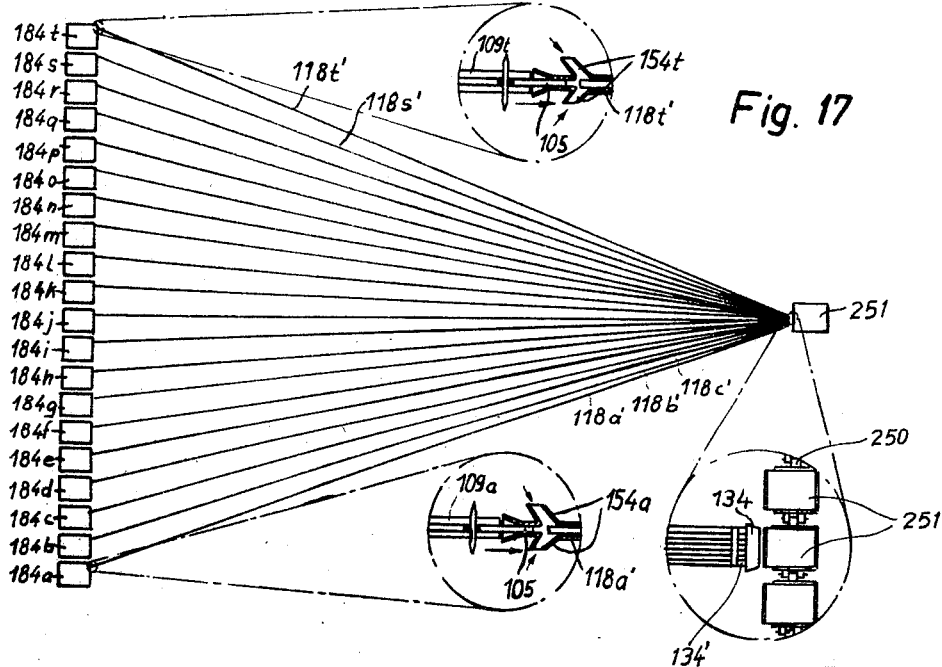

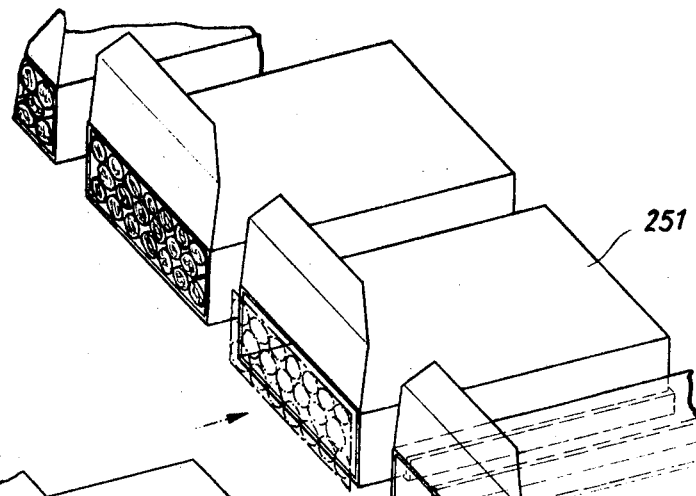
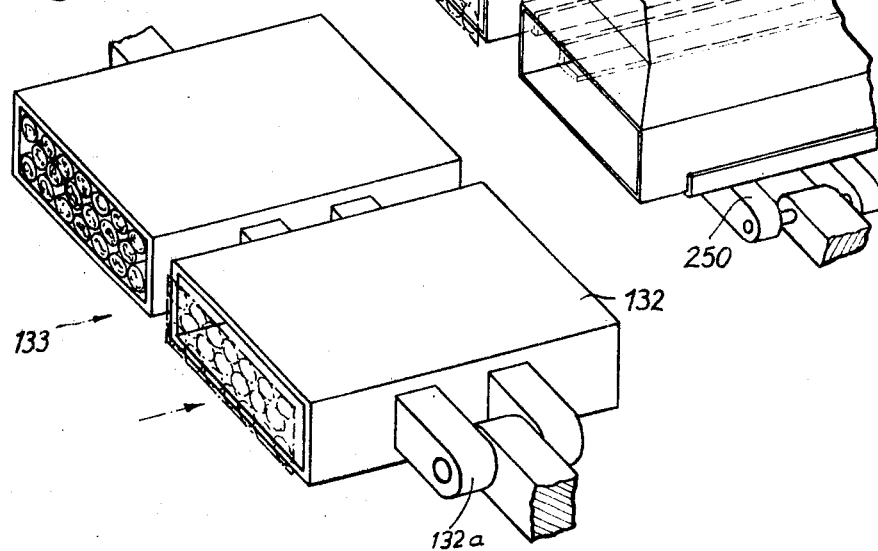
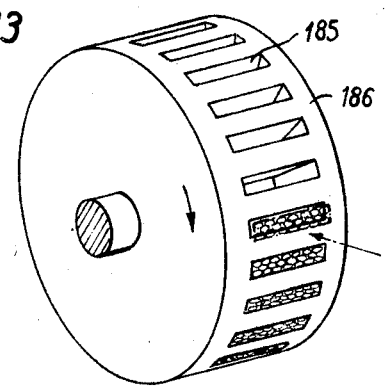

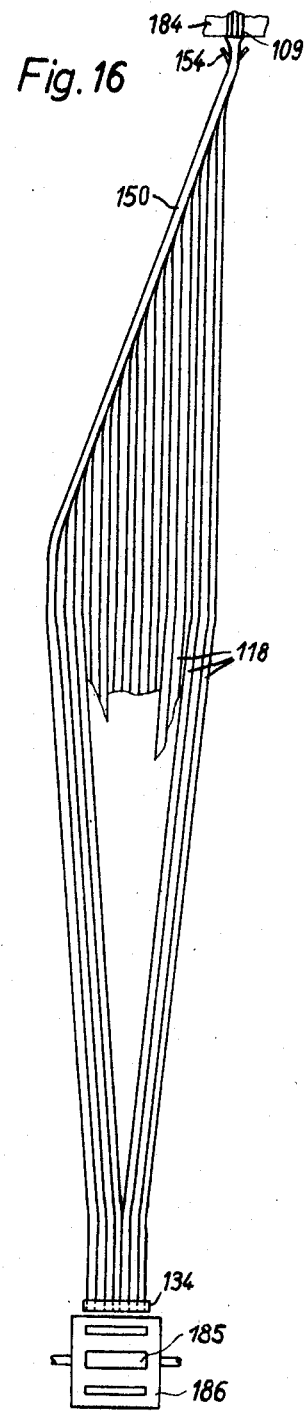
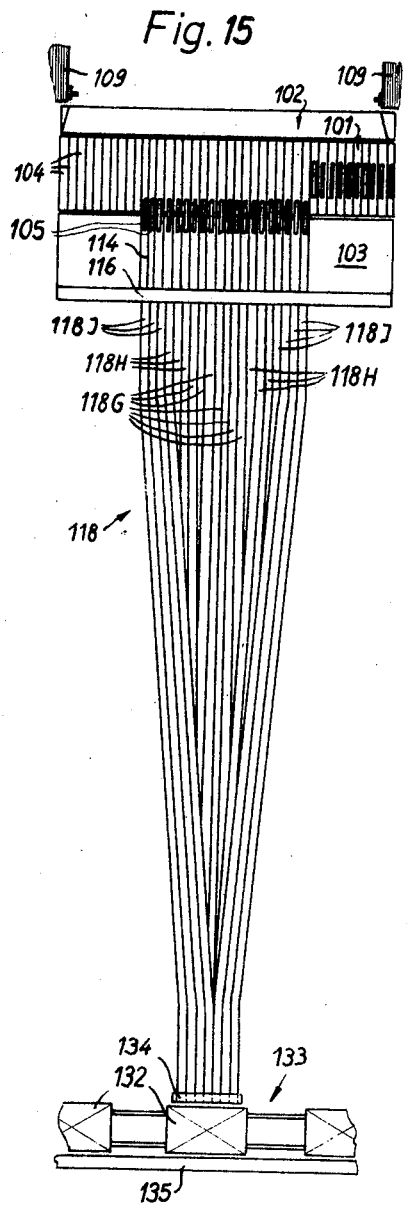

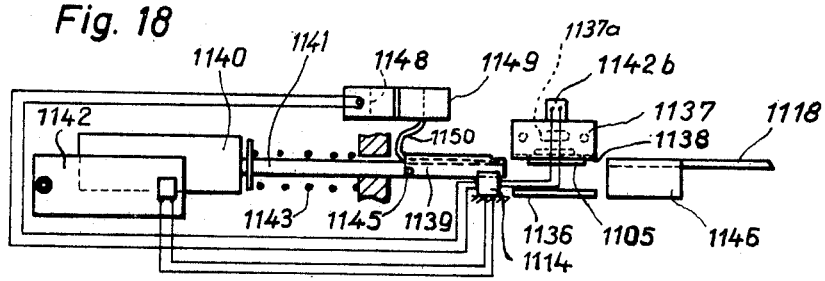
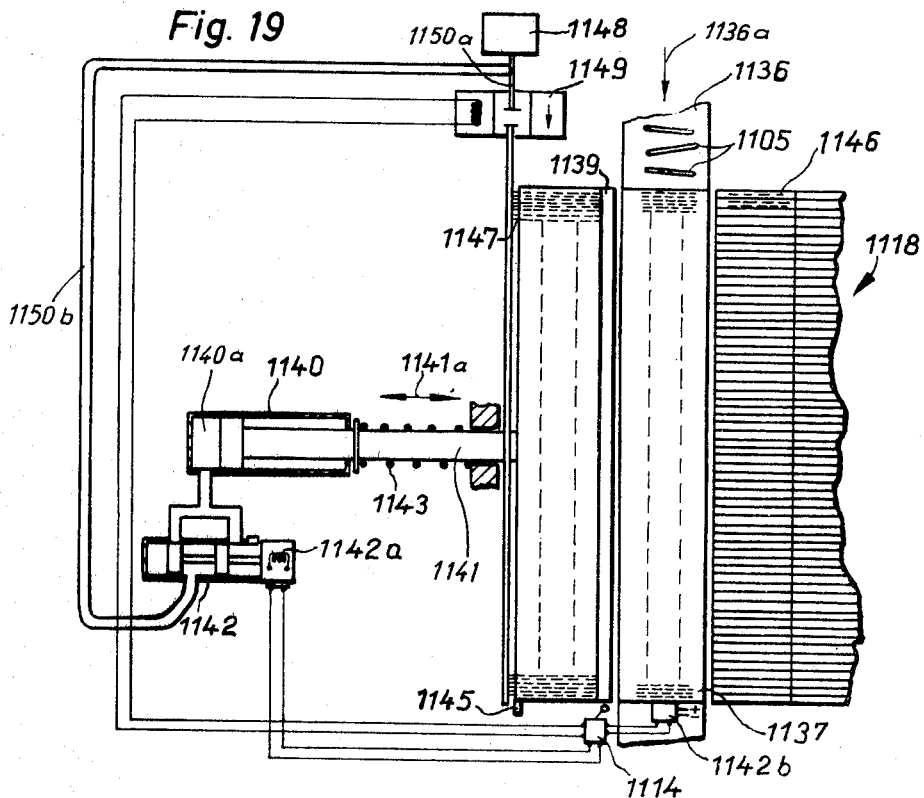

United States Patent Office 3,513,619
Patented May 26, 1970

3,513,619
APPARATUS FOR ARRAYING CIGARETTES OR THE LIKE
Horst Kochalski, Hamburg-Lohbrugge, and Ulrich Bornfieth, Hamburg-Bergedorf, Germany, assignors to Hauni-Werke Korber & Co. KG, Hamburg-Bergedorf, Germany
Filed July 13, 1967, Ser. No. 653,234
Claims priority, application Great Britain, July 18, 1966, 32,267/66; Oct. 12, 1966, 45,669/66
Int. Cl. B65b *19/04, 57/20;* B65h *19/12*
U.S. Cl. 53—62        24 Claims

ABSTRACT OF THE DISCLOSURE

Apparatus which assembles cigarettes or like rod-shaped articles to form arrays which are ready for further processing, particularly in wrapping or packing machines without the interposition of chargers or trays. The apparatus comprises at least one set of pneumatic tubes whose outlets are grouped to discharge successively at least one array of rod-shaped articles at a time, a feed for supplying articles lengthwise into the inlets of the tubes, and receiving means for accepting arrays of articles from the outlets. The feed may include one or more producing machines which can deliver articles directly into the inlets of pneumatic tubes, or a suitable distributing unit which receives articles from one or more producing machines and groups them for simultaneous or sequential admission into pneumatic tubes. The receiving means may include one or more processing machines and/or one or more conveyors which accept arrays from the outlets of pneumatic tubes and convey such arrays to processing machines.

BACKGROUND OF THE INVENTION

The present invention relates to a method and apparatus for arraying cigarettes, cigars, cigarillos, cheroots or like rod-shaped articles with or without filters. More particularly, the invention relates to a method and apparatus for arraying mass-produced rod-shaped articles in formations which are ready for wrapping or for introduction into prefabricated packs or like receptacles.

In accordance with presently prevailing practice, cigarettes coming from a producing machine are stacked in so-called chargers or trays and are transferred in such trays to storage or directly to packing machines. As a rule, cigarettes are introduced into trays in such a way that they form arrays of superimposed layers wherein the cigarettes of each layer are staggered transversely with reference to cigarettes in the adjoining layers. Furthermore, each tray preferably accommodates the same number of cigarettes. The formations of cigarettes in such trays are destroyed when the cigarettes are withdrawn for delivery into the packing machine and the thus withdrawn cigarettes are arrayed again, often in formations of twenty cigarettes each, for introduction into the packing station where the freshly formed arrays of twenty cigarettes each enter prefabricated packs or are confined in packs obtained by conversion of blanks made of paper, cardboard or plastic. The machinery required for stacking of cigarettes in trays, for conveying of filled trays from the stacking station to a packing machine, for removal of cigarettes from filled trays, for conversion of the thus removed cigarettes into groups or arrays which are ready for packing or wrapping, and for returning of empty trays to the stacking station occupies much room, comprises a very large number of costly and complicated parts, and can affect the appearance as well as the quality of cigarettes because tobacco particles are likely to escape at the ends during introduction into or evacuation from trays. Furthermore, stacking of cigarettes in trays and removal of cigarettes from filled trays with simultaneous formation of arrays which are ready for packing or wrapping consumes much time and requires complicated control equipment, especially if such machinery is installed in automatic production lines wherein the output of a large number of cigarette rod machines, filter cigarette machines or like producing machines is fed to plural wrapping, packing or other consuming machines.

Temporary stacking of cigarettes or other rod-shaped articles which contain tobacco or are used in connection with the manufacture of tobacco-containing products is considered a necessary evil in the manufacture of such articles and is being accepted by manufacturers in the absence of a satisfactory alternative.

SUMMARY OF THE INVENTION

It is an important object of our invention to provide a novel and improved method of transporting cigarettes or like rod-shaped articles from producing machines to processing or consuming machines in such a way that articles issuing from one or more producing machines can be immediately assembled into arrays or formations which are needed in the processing or consuming machines so that the aforementioned chargers or trays may be dispensed with.

Another object of the invention is to provide an apparatus which may be utilized in the practice of our method and to construct and assemble the apparatus in such a way that the time as well as the amount of equipment required for transfer of articles from producing to consuming machines is reduced considerably with attendant savings in man hours and cost.

A further object of the invention is to provide an apparatus of the just outlined character which can convert rod-shaped articles issuing individually from one or more producing machines into formations required in the consuming machines with a minimum of manipulation and with attendant reduction of the danger of contaminating, deforming or otherwise damaging the articles.

A concomitant object of the invention is to provide the improved apparatus with novel article conveying, distributing, feeding and receiving devices.

Briefly outlined, one feature of our invention resides in the provision of a method of assembling cigarettes or like rod-shaped articles which are thereupon maintained during further processing. The method comprises the basic steps of feeding articles individually to a distributing station, and pneumatically conveying articles from the distributing station to a receiving station with simultaneous formation of arrays.

The articles are conveyed in separate paths which are preferably defined by pneumatic tubes, and the feeding step preferably comprises supplying the output of at least one producing machine into such separate paths. The articles which are fed to the distributing station may be assembled into a succession of groups of, for example, twenty articles each and the number of paths may equal the number of articles in a group so that each path can receive one article of a group. The conveying step then comprises conveying successive groups from the distributing to the receiving station. The articles of successively assembled groups preferably form identical formations and may be disposed in a common plane or along an arcuate (concave or convex) surface. A fresh group of articles can be assembled at the distributing station while the preceding group travels to the receiving station.

The arrangement may be such that each path receives the output of a separate producing machine and the articles approaching the distributing station may travel lengthwise or sideways. Each array may comprise a single layer or plural layers of articles and the articles of layers which are to form an array can arrive at the receiving station simultaneously or at timely spaced intervals. Articles arriving at the distributing station may be propelled by blasts of compressed air.

The distributing station may accommodate take-off conveyors of several producing machine, a rotary collecting drum which delivers groups of articles into the inlets of pneumatic tubes, a tubular distributor which communicates with the inlet of each pneumatic tube, a suction head which can receive articles from a supply conveyor serving to advance articles sideways, or any other equivalent device or group of devices which can deliver articles to the inlets of pneumatic tubes. The receiving station may accommodate one or more conveyors which carry cells, prefabricated receptacles or other means for receiving and transporting arrayed articles. Furthermore, the receiving station may accommodate one or more processing or consuming machine, for example, a packing machine capable of processing the output of one, two or more rod cigarette machines or filter cigarette machines.

The novel features which are considered as characteristic of the invention are set forth in particular in the appended claims. The improved arraying apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an end elevational view of a distributor unit including three drums which are used in an apparatus for conversion of the output of a single producing machine into a succession of arrays;

FIG. 4 is an axial section as seen in the direction of arrows from the line IV—IV of FIG. 2;

FIG. 5 is a fragmentary partly elevational and partly sectional view of a distributor unit which constitutes a modification of the unit shown in FIG. 2, the section being taken in the direction of arrows from the line V—V of FIG. 4;

FIG. 6 is a fragmentary schematic plan view of another apparatus wherein a single tubular distributor furnishes the output of one or more producing machines to the inlets of a large number of pneumatic tubes;

FIG. 7a illustrates the details of one of several control elements which are utilized in the apparatus of FIG. 6;

FIG. 7b illustrates a modified control element;

FIG. 8 is an enlarged view of the structure within the phantom-line rectangle 165 shown in FIG. 6;

FIG. 9 illustrates certain details of an apparatus which constitutes a modification of the apparatus shown in FIG. 6;

FIG. 12 is a fragmentary perspective view of a chain conveyor whose cells can receive arrays of rod-shaped articles from pneumatic tubes shown in FIG. 10 or 11;

FIG. 13 is a perspective view of a turret which forms part of a packing machine and can receive arrays of rod-shaped articles from pneumatic tubes shown in FIG. 10 or 11;

FIG. 14 is a fragmentary perspective view of a conveyor for prefabricated packs which can receive arrays of rod-shaped articles from pneumatic tubes shown in FIG. 10 or 11;

FIG. 15 is a diagrammatic top plan view of an arraying apparatus which embodies the structure shown in FIGS. 2–4, 10 and 12, certain parts being shown in developed view as in FIG. 3;

FIG. 16 is a schematic top plan view of an apparatus which embodies the structure shown in FIGS. 6, 10 and 13;

FIG. 17 is a schematic top plan view of an apparatus wherein each pneumatic tube receives rod-shaped articles from a separate producing machine, certain details of this apparatus being shown on a greater scale within phantom-line circles with indications where the details can be found in the overall view of this illustration;

FIG. 18 is a partly elevational and partly vertical sectional view of a further apparatus wherein the articles coming from one or more producing machines travel sideways; and FIG. 19 is a fragmentary top plan view of the apparatus shown in FIG. 18.

DESCRIPTION OF THE PREFERRED EMBODIMENTS

Figure 1:
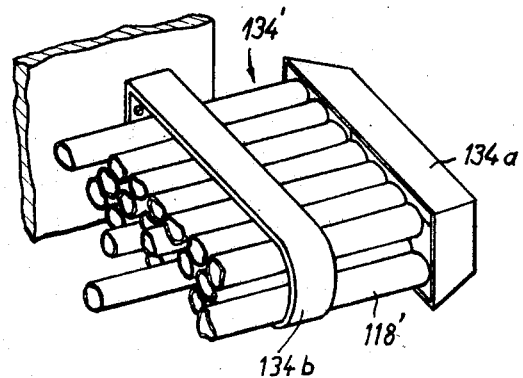
FIG. 1 is a diagrammatic view of an arraying apparatus wherein the output of a producing machine for rod-shaped articles is converted directly into a succession of arrays which can be introduced into a receiving unit which may include a processing or consuming machine.

FIG. 1 is a diagram showing certain components of an apparatus which embodies our invention. The character A denotes one or more producing machines, for example, a rod cigarette machine, a filter cigarette machine, a cigar machine or a filter machine, whose output is fed to a distributor unit B which serves to supply groups of cigarettes or like rod-shaped articles into a plurality of convergent paths defined by a series of pneumatic tubes C. During travel from the station which accommodates the distributor unit B to the station which accommodates a receiving unit D, cigarettes advancing lengthwise in the tubes C are automatically assembled in formations or arrays of, for example, twenty parallel articles each, so that such arrays can be immediately used in a wrapping, packing or like consuming or processing machine. The machine A and the distributor unit B together form a feed which supplies articles lengthwise to the inlets of the tubes C, and the discharge ends or outlets of the tubes C are grouped in such a way that they can discharge at least one array of articles at a time. The receiving unit D accepts such arrays from the outlets of the tubes C.

Figure 3:
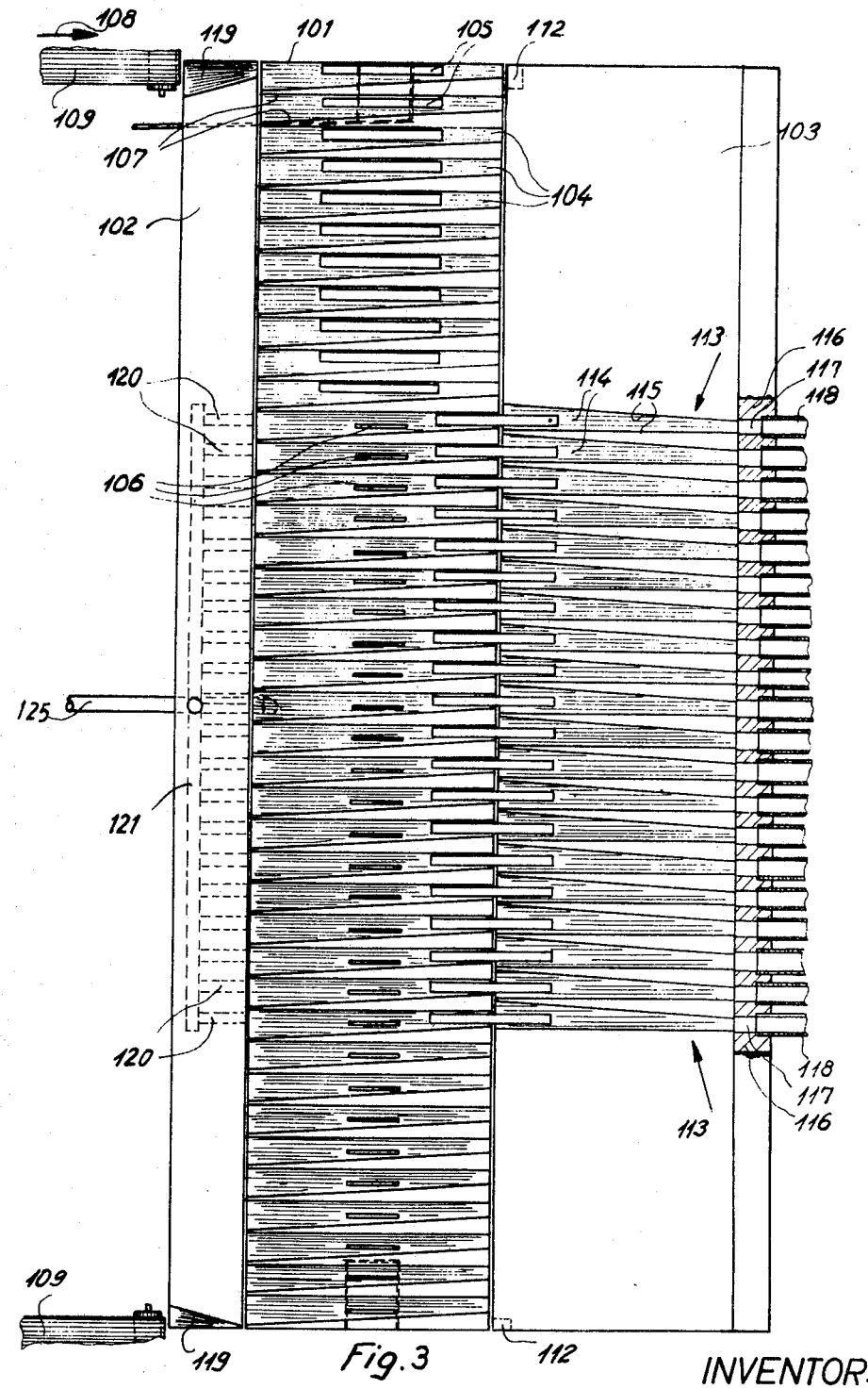
FIG. 3 is a developed plan view of the drums shown in FIG. 2, further showing the inlets of pneumatic tubes which receive rod-shaped articles from the drums and the take-off conveyor of a producing machine which delivers articles to the drums.

FIGS. 2 to 5 illustrate in greater detail one form of apparatus which embodies the units B, D and the tubes C of FIG. 1. FIG. 3 shows an endless take-off belt 109 which forms part of a cigarette machine A and advances rod-shaped articles 105 (hereinafter called cigarettes for short) lengthwise in the direction indicated by an arrow 108. This take-off belt 109 delivers cigarettes 105 into a channel 119 provided in a stationary feed drum 102 adjacent to one axial end of a rotary collecting member or drum 101. The other axial end of the collecting drum 101 is adjacent to a stationary transfer member or drum 103. The collecting drum 101 (hereinafter called collector for short) is provided with axially parallel equidistant peripheral portions having pockets or flutes 104 of substantially semicircular cross-sectional outline which serve to transport cigarettes 105 sideways, namely, from registry with the channel 119 into registry with one of twenty equidistant axially parallel peripheral pockets or flutes 114 provided on the transfer drum 103. The bottom region of each flute 104 is provided with an elongated suction slot or duct 106, and each of these flutes tapers gradually from the feed drum 102 toward the transfer drum 103 (see the mutual inclination of edges 107 bounding the next-to-the-topmost flute 104 of FIG. 3), The collector 101 is hollow and accommodates a stationary suction chamber 110 (see FIG. 2 or 4) which communicates with a certain number of suction ducts 106 in each angular position of the collector 101 to insure that a cigarette 105 which has entered a flute 104 will remain therein until the flute moves into registry with an empty pocket 114 of the transfer drum 103. The suction chamber 110 is connected with a suction conduit 111 whose discharge end is connected to the inlet of a suction pump or another suitable suction generating device, not shown.

That axial end of the transfer drum 103 which is adjacent to the collector 101 is provided with a braking nozzle 112 which can discharge jets of compressed air or other suitable gas into successive flutes 104 of the collector for the purpose of reducing the speed of cigarettes 105 and of insuring that each cigarette which has been delivered by the takeoff belt 109 of the producing machine A comes to a halt in a position substantially midway between the ends of the respective flute 104. The pockets 114 are provided in a portion 113 of the periphery of the drum 103 and they also taper in the same direction as the flutes 104, i.e., away from the collector 101. The lead lines of the numeral 115 shown in FIG. 3 denote the edges of the topmost pocket 114, and it will be seen that these edges converge in a direction to the right so that the passages in which the cigarettes travel axially of the drum 103 become narrower to insure that the leading end of each cigarette will be accurately aligned with one opening 117 of a stationary guide member or mouthpiece 116 adjacent to the right-hand axial end of the transfer drum 103. Each opening 117 of the guide member 116 registers with the inlet of an elongated pneumatic tube 118, these tubes corresponding to the tubes C shown in FIG. 1. The transfer of cigarettes 105 in the paths defined therefor by the tubes 118 is preferably carried out by means of compressed air.

The feed drum 102 is further provided with a row of orifices 120 each of which registers with the left-hand end of a pocket 114, as viewed in FIG. 3, i.e., with the inlet of one of the tubes 118. The orifices 120 serve to discharge blasts or jets of compressed air at such intervals that they compel a group of twenty cigarettes 105 to leave the adjoining flutes 104 and to advance lengthwise into and beyond the respective pockets 114 of the transfer drum 103. The means for connecting the orifices 120 with a suitable source of compressed air comprises a distributing channel 121 which is machined into the drum 102 and communicates with each orifice, a first supply channel 122 (see FIGS. 2 and 4) which is connected with the channel 121 and comprises two slightly spaced sections separated from each other by an annular portion of a cylindrical valve member 123 affixed to or integral with the collector 101. The annular portion of the valve member 123 is provided with apertures 124 which permit compressed air to flow between the two sections of the supply conduit 122 in order to admit compressed air to the channel 121 and orifices 120. A second supply conduit 125 connects the source of compressed air with the first supply conduit 122. The distribution of apertures 124 is such that the orifices 120 receive compressed air only when a group of twenty cigarettes 105 in the flutes 104 registers with the stationary pockets 114.

Of course, the distributing channel 121 can be connected with a source of compressed air in a number of ways, not only by means of apertures 124 in the rotary valve member 123. A second solution is illustrated in FIG. 5 wherein the supply conduit 122' contains a valve 131 which is associated with a counter 128 serving to count the number of flutes 104 and to open the valve in response to placing of twenty filled flutes 104 into registry with the pockets 114. Alternatively, the counter 128 can determine the angular displacement of the collector 101 and can open the valve 131 when the displacement is such that a requisite number of filled flutes 104 register with the pockets 114. The collector 101 carries a gear 126 whose teeth cause an initiator 127 to produce successive output signals which are transmitted to the counter 128. The initiator 127 is of known design; for example, it may be constituted by an approximation or gap initiator whose exact construction forms no part of the present invention. Its operation is based on the principle that a signal is generated when a ferromagnetic body (i.e., in the present instance a tooth of the gear 126) interrupts a high-frequency oscillation. The counter 128 causes the valve 131 to open when it receives a requisite number of signals (for example, a series of twenty signals). The counter then resets itself to zero and starts to count a fresh sequence of signals which are transmitted by the initiator 127. It is clear that the initiator 127 can be replaced by other types of signal generators, for example, by a light-sensitive receiver or an inductive, capacitative or like signal generator or by a generator employing isotopic rays. The valve 131 is installed at the junction of supply conduits 122', 125 or in one of these conduits and opens just long enough to admit into the orifices 120 jets of air which are strong enough to expel a requisite number of cigarettes 105 into and beyond the pockets 114. An important advantage of the modification shown in FIG. 5 is that the number of cigarettes which are shifted from the collector 101 into the pockets 114 can be varied at will and that no mechanical moving parts are needed to start or to terminate the admission of compressed air. However, it is equally within the purview of our invention to utilize other types of valves. For example, the valve 131 could be replaced by a cam-operated valve and the cam for effecting opening and closing of such valve could be mounted on or could rotate in synchronism with the collector 101.

In FIG. 4, the gear 126 is shown for the sole purpose of facilitating the interpretation of FIG. 5. In actual practice, the collector 101 is provided with the valve member 123 or with the gear 126.

The transfer drum 103 is preferably surrounded by a cylindrical shield 100 of transparent or translucent vitreous or plastic material (e.g., Plexiglas), and such shield preferably extends all the way to the feed drum 103 to surround the entire collector 101.

The width of the intake ends of flutes 104 is such that each such flute can receive a cigarette 105 through the channel 119 of the stationary feed drum 102 even if the collector 101 is driven at a relatively high speed. The same applies for the width of intake ends of the pockets 114 in the transfer drum 103.

The drum 103 and the guide member 116 may be omitted if the collector 101 rotates at a relatively low speed or interminttently, i.e., if the discharge ends of flutes 104 can be placed into accurate registry with the inlets of pneumatic tubes 118 at the time the orifices 120 receive compressed air from the distributing channel 121. However, and if the collector 101 turns at a relatively high speed, the tapering pockets 114 of the drum 103 will be capable of receiving groups of cigarettes 105 without any damage to such articles. The blasts or jets of air admitted by the orifices 120 can be strong enough to convey cigarettes 105 from the flutes 104 through the pockets 114, openings 117 and all the way through and beyond the outlets of the tubes 118.

In FIGS. 2-4, the take-off belt 109 constitutes a porttion of the producing machine A shown in FIG. 1, and the parts 100-117 and 119-125 together form the distributor unit B of FIG. 1.

The operation of the apparatus shown in FIGS. 2 to 4 is as follows:

A producing machine discharges a succession of individual cigarettes 105 which are transported by its take-off belt 109 (arrow 108 in FIG. 2) and travel through the guide channel 119 of the feed drum 102. Each such cigarette enters a flute 104 of the rotary collector 101. The means for accelerating the cigarettes 105 on the upper stringer of the take-off belt 109 may comprise one or more eccentrically mounted elastic rollers or one or more nozzles which discharge blasts of compressed air. Such accelerating means is preferably employed to effect lengthwise separation of successive cigarettes 105 by distances which suffices to insure that the collector 101 can turn through a small angle before the leading end of the next-folling cigarette advances beyond the channel 119 of the feed drum 102. The aforementioned braking nozzle 112 of the fixed transfer drum 103 discharges jets of compressed air which brake the cigarettes 105 in the flutes 104, and such braking action is enhanced by suction produced in the chamber 110 and communicated through the ducts 106. In fact, and if the suction is strong enough, the braking nozzle 112 can be dispensed with. All that counts is to insure that each cigarette 105 comes to a halt somewhere between the ends of the respective flute 104 so that the collector 101 can continue to turn and to place the cigarettes into registry with the pockets 114. The valve member 123 (FIGS. 2 and 4) or the valve 121 (FIG. 5) causes or permits entry of compressed air into the orifices 120 when each pocket 114 registers with a filled flute 104 whereby the jets of air cause the cigarettes 105 to move axially and to travel through the registering pockets and openings 117 and to enter the inlets of corresponding tubes 118.

It is clear that the open-sided flutes 104 and pockets 114 can be replaced by tunnels or bores. If the collector 101 and/or the transfer drum 103 is formed with such bores or tunnels, the diameter of each bore preferably diminishes in a direction away from the feed drum 102.

FIGS. 6, 7a and 8 illustrate a portion of a further apparatus which can form arrays of cigarettes coming from a feed including one or more producing machines 184. The take-off belt 109 of the machine 184 (shown in the lower part of FIG. 6) delivers cigarettes lengthwise and can be made of foraminous material so that its upper stringer can be placed above a suction chamber to advance the cigarettes at a desired speed. The cigarettes are introduced into the intake end of a tubular distributor 150 (hereinafter called pipe) which replaces the parts 101, 102, 103, 116 of FIG. 2. The pipe 150 accommodates a series of twenty pneumatic switching devices 151b–151t (hereinafter called switches for short) which can detour cigarettes into the inlets of associated pneumatic tubes 118a–118t. The operation of the pipe 150 and switches 151b–151t is based on the Coanda effect and each of these switches comprises two control nozzles respectively numbered 152b–152t and 153b–153t. The main jet of gas is admitted through one or more main orifices 154 (see also FIG. 17). During travel past the junctions between the distributor pipe 150 and successive pneumatic tubes 118b–118t, the main jet continues to travel along that surface against which it was deflected by a control jet discharged from one of the aforementioned control nozzles. Thus, the direction of the main jet can be changed in a very simple way by admission of a control jet, either through a nozzle 152 or through a nozzle 153. The nozzles 152b–152s and 153b–153s receive compressed air from branches 156b–156s of a first auxiliary line 156 through bistable pneumatic control elements 155b–155s one of which is illustrated in greater detail in FIG. 7a. The control elements 155b–155s and 155t form part of switches 151b–151t and are respectively provided with outlets 157b–157t and 158b–158t which admit compressed air to control nozzles 152b–152t and 153b–153t. The connections between these outlets and the corresponding control nozzles are respectively shown at 159b–159t and 160b–160t.

Referring to FIG. 7a in detail, there is shown in bistable pneumatic control element 155 which includes a spherical valve member 161 movable in a short valve body or cylinder 162. The cylinder 162 has two end walls provided with inlets 163, 164 which can admit compressed air from the first auxiliary line 156. Each of the two outlets 157, 158 is adjacent to one end wall and extends radially of the cylinder 162. The effective cross-sectional area of the inlet 163 is greater than that of the inlet 164 because the conduit admitting air to the inlet 164 is throttled at 166. This conduit branches from the first auxiliary line 156, and the latter is also provided with a second branch connected to the inlet 163. A control line 167 communicates with that branch which connects the first auxiliary line 156 with the inlet 163. The control line 167 can be placed in communication with the atmosphere to effect a reduction of air pressure in the right-hand portion of the cylinder 162. Thus, and when the control line 167 is open to the atmosphere, the pressure of air admitted via inlet 164 will exceed the pressure in the inlet 163 so that the valve member 161 will remain in the position shown in FIG. 7a despite the fact that the flow of air to the inlet 164 is throttled at 166. The valve member 161 then allows air admitted via inlet 164 to enter the outlet 158. If the control line 167 is thereupon sealed from the atmosphere, pressure in the right-hand portion of the cylinder 162 rises and the valve member 161 moves against the inlet 164 to permit flow of compressed air from the inlet 163 into the outlet 157 but to seal the outlet 158 from both inlets. The ratio of effective cross-sectional areas of the inlets 163, 164 is selected in such away that the valve member 161 continues to seal the inlet 164 from the outlet 158 even if the air pressure in the inlet 164 rises and equals that in the auxiliary line 156. In fact, the valve member 161 continues to seal the inlet 164 even if the control line 167 is thereupon connected with the atmosphere. Therefore, the control element 155 of FIG. 7a is provided with a restoring line 168 which can admit compressed air into the left-hand end of the cylinder 162 at a pressure necessary to effect return movement of the valve member 161 to the illustrated position.

In FIGS. 6 and 8, the numerals 168b–168t and 167b–167t respectively denote various restoring lines and control lines. The restoring lines 168b–168t receive compressed air from a second auxiliary line 170.

FIG. 7b illustrates a modified bistable pneumatic control element 155′ wherein the spherical valve member 161 is replaced by a more rapidly reacting diaphragm 169. Aside from the fact that the valve body or cylinder 162′ of FIG. 7b can be made somewhat shorter, the construction of the control elements 155, 155′ is otherwise identical. The cylinders 162, 162′ can be mass-produced of plastic material. Each of the control lines 167b–167t communicates with one of the tubes 118a–118s.

Referring again to FIG. 6, the second auxiliary line 170 which supplies compressed air to the restoring line 168b–168t contains an adjustable valve 171 and is connected to a source 172 of compressed air. The valve 171 is a pressure-responsive valve and responds to pressure of air issuing from the outlet 157t of the last control element 155t. When the valve 171 opens, the auxiliary line 170 connects the source 172 with the restoring lines 168b–168t so as to reset each of the valve members 161 or 169 to the positions respectively shown in FIGS. 7a and 7b.

The operation of the just described apparatus will be described with reference to FIG. 8 which illustrates, on a larger scale, the structure within the phantom-like rectangle 165 shown in the upper part of FIG. 6. This rectangle embraces the switches 151b, 151c and their control elements 155b, 155c as well as the control element 155d. It is assumed that the assembly of a new array of twenty cigarettes 105 is about to begin, i.e., the valve members 161 of all control elements 155b–155t are in positions corresponding to that of the valve member 161 shown in FIG. 7a because the last cigarette 105 of the preceding array has caused the control element 155t to open the valve 171 in the second auxiliary line 170 and to admit compressed air to the restoring lines 168b–168t.

The foremost cigarette 105 on the take-off belt 109 enters the inlet of the distributor pipe 150 and advances past all of the switches 151b–151t because the outlets 158b–158t of all control elements receive air from the corresponding branches 156b–156t admit jets of air which keep the foremost cigarette 105 against entry into the inlet of one of the tubes 118b–118t. Thus, the foremost cigarette simply continues to pass through the distributor pipe 150 and ultimately enters the inlet of the rightmost tube 118a. The foremost cigarette is conveyed in the main jet of compressed gas which is admitted by the main orifice or orifices 154.

The control line 167b of the control element 155b is in communication with the inlet of the tube 118a and, when the foremost cigarette 105 enters the tube 118a, it seals the open end of the control line 167b whereby the corresponding valve member 161 changes its position and seals the branch 156b of the first auxiliary line 156 from the outlet 158b. At the same time, the valve member 161 of the control element 155b connects the branch 156b with the outlet 157b so that the control nozzle 152b discharges a jet of compressed air which deflects the main jet into the inlet of the second tube 118b. Air which has entered the outlet 157b flows through the connection 159b. The valve member 161 of the control element 155b then remains in the new position for reasons which were explained in connection with FIG. 7a. When the next-following cigarette 105 reaches the junction 151b, it is caused to enter the inlet of the tube 118b and temporarily seals the open end of the control line 167c to change the position of the valve member 161 in the control element 151c. Thus, the outlet 157c of the control element 155c then admits compressed air to the connection 159c and nozzle 152c at the junction 151c. The main jet is deflected into the inlet of the third tube 118c which receives the third cigarette 105, such third cigarette causing the control element 155d to admit air to the nozzle 152d, and so forth. When the last one of a series of twenty cigarettes 105 reaches the switch 151t and moves past the control line 167t of the control element 155t on its way into the inlet of the tube 118t, the outlet 157t of the control element 155t admits compressed air to the valve 171 in the second auxiliary line 170 so that the latter admits air from the source 172 into each of the restoring lines 168b–168t in order to return the valve members 161 of the control elements 155b–155t to their original positions. The apparatus then begins to assemble a fresh array of twenty cigarettes 105 in the just described manner.

In the apparatus of FIG. 6, the parts 184, 150 and 151 constitute a feed which is an equivalent of the producing machine A and distributor unit B shown in FIG. 1.

FIG. 9 illustrates an apparatus wherein the pneumatic control elements 155 (FIG. 7a) or 155′ (FIG. 7b) are replaced by bistable electropneumatic control elements 187. Each contril element (only the control elements 187b, 187c and 187d are shown) comprises a cylinder 173 accommodating an axially reciprocable piston-like valve member 174. The position of the valve member 174 can be changed by an electromagnet 175. The outlets of the control element 187b are shown at 157b, 158b and a branch of the first auxiliary line 156 admits compressed air substantially in the same way as described in connection with FIGS. 6 to 8. Connections 159b, 160b admit air from outlets 157b, 158b to the control nozzles 152b, 153b of the switch 151b at the junction of the distributor pipe 150 and the inlet of the tube 118b. A return spring 176b replaces the restoring line 168b, i.e., this spring will restore the valve member 174b to a starting or normal position when the respective electromagnet 175b is deenergized.

The electromagnet 175b will be energized in response to a signal produced by a signal generator or detector in the tube 118a. Such signal is initiated by a cigarette 105 which has entered the inlet of the tube 118a. The signal generator can operate photoelectrically, capacitatively, inductively or with isotopic rays. The signal is received in a storing unit 178b which can transmit the signal to the electromagnet 175b through an amplifier 179b (if necessary). The storing unit 178b has a signal storing input G and a signal erasing input H and has a tendency to erase the signal. Storing units which can store and amplify electric signals are well known in the art. In the embodimen of FIG. 9, the signal generator comprises a light-sensitive device 180b including a source 181b of light and a receiver 182b. The inlet of the tube 118a has a section or portion 183a which consists of transparent or translucent material and is disposed between the light source 181b and receiver 182b. The output of the light-sensitive device 180b is connected with the input G of the storing unit 178b. The output of the second light-sensitive device 180c in the inlet of the tube 118b is connected with the input G of the second storing unit 178c and with the input H of the first storing unit 178b. The remaining reference numerals shown in FIG. 9 denote in part components which were described in connection with FIGS. 6–8 or components which are analogous to the just described components. For example, the second control element 187c comprises a valve member 174c, an electromagnet 175c and two outlets 157c, 158c.

The operation is as follows:

Prior to assembly of a fresh array of twenty cigarettes, the valve members 174 of all control elements 187 stay in their normal positions. Thus, and referring to the control element 187b, its valve member 174b seals the outlet 157b but connects the outlet 158b with the auxiliary line 156 so that the connection 160b admits air to the control nozzle 153b which causes the main jet of air to flow past the inlet of the tube 118b and into the tube 118a. The foremost cigarette of a series travels through the distributor pipe 150 and enters the inlet of the tube 118a. This cigarette travels through the transparent portion 183a of the tube 118a and causes the light-sensitive device 180b to produce a signal which is transmitted to the input G of the storing unit 178b. The storing unit 178b sends an output signal via amplifier 179b, and such signal causes energization of the electromagnet 175b which attracts the valve member 174b against the opposition of the return spring 175b so that the valve member 174b seals the auxiliary line 156 from the outlet 158b but connects the line 156 with the outlet 157b so that the connection 159b can admit air to the control nozzle 152b which deflects the main jet into the inlet of the tube 118b. The next cigarette enters the inlet of the tube 118b and passes through the transparent portion 183b of this tube whereby the light-sensitive device 180c sends a signal to the input G of the storing unit 178c as well as to the erasing input H of the storing unit 178b. The output signal of the storing unit 178c causes the valve member 174c to admit air from the auxiliary line 156 into the control nozzle 152c so that the main jet of air is deflected into the inlet of the tube 118c. The signal transmitted from the cell 182c to the input H of the storing unit 178b erases the signal at the input G of the unit 178b so that the electromagnet 175b is deenergized and the valve member 174b returns to the position of FIG. 9, i.e., the control nozzle 153b discharges air but such air cannot affect the flow of the main jet because the latter is deflected at the switch 151c and flows into the inlet of the tube 118c. It will be seen that, contrary to the operation of the apparatus shown in FIG. 6, the apparatus of FIG. 9 resets or restores the valve members 174 immediately after the respective tube 118 receives a cigarette.

The light-sensitive device (not shown) in the last tube (corresponding to the tube 118t of FIG. 6) sends a signal to the input H of the last storing unit which serves to transmit signals to the last control element 187. In this way, all of the control elements are reset prior to assembly of the next array.

It is clear that the erasing inputs H of the control elements 187 can be connected to a control conductor which sends an erasing signal in response to a signal received from the last light-sensitive device 180. Such a construction would be even more similar to the construction shown in FIGS. 6–8 which latter utilizes a line 170 serving to reset the valve members 161 or 169 upon completed assembly of an array.

Figure 10:
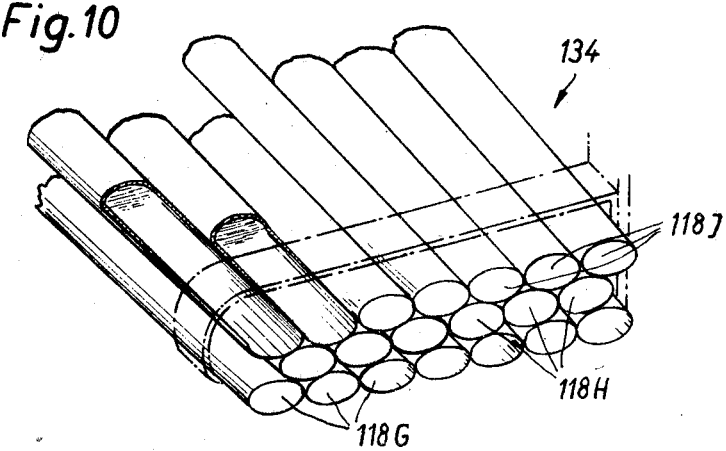
FIG. 10 is a fragmentary perspective view of a set of pneumatic tubes whose outlets discharge rod-shaped articles in arrays of twenty articles each.

FIG. 10 illustrates the manner in which the outlets 134 of twenty pneumatic tubes 118 are grouped to discharge successive arrays of twenty cigarettes each in the formation which is customary in a cigarette pack. The wall thicknesses of outlets 134 decrease toward their open ends so that cigarettes issuing from such outlets are immediately adjacent to each other. This is clearly shown in FIG. 10 wherein the outlets 134 of the tubes 118 together form a body which resembles a truncated pyramid. The three layers or rows 118G, 118H, 118J of tubes 118 will respectively discharge layers of seven, six and seven cigarettes each, and the cigarettes of the median layer are staggered transversely with reference to the cigarettes in the outer layers. It is clear that the number of tubes 118 can be selected at will and that the outlets 134 of such tubes can be grouped to form arrays of four, five, eight, ten, or another number of cigarettes or like rod-shaped articles. Moreover, the outlets 134 shown in FIG. 10 can be rearranged to discharge cigarettes in the form of a single layer, in two layers or in four or more layers. Circular formations are possible.

Figure 11:
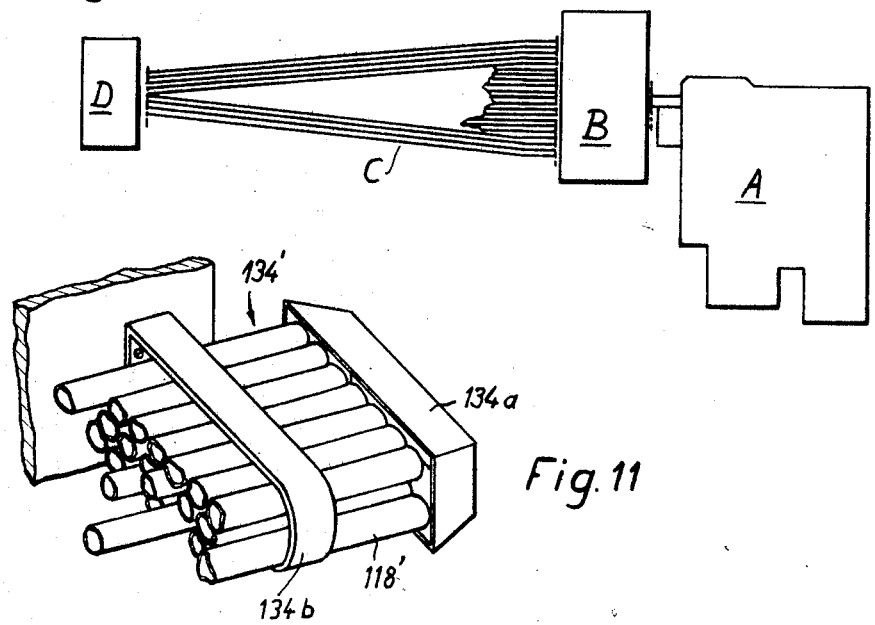
FIG. 11 is a similar perspective view of the outlets of slightly different tubes.

FIG. 11 illustrates a modification of the just described structure. The outlets 134' of tubes 118' are of constant wall thickness and, therefore, cigarettes issuing from the tubes 118' are caused to pass through a condensing element in the form of a funnel 134a which moves the cigarettes nearer to each other before such cigarettes enter the consuming machine or a conveyor which delivers them to the consuming machine. A strap 134b holds the outlets 134' together so that such outlets form a group capable of discharging cigarettes in a predetermined formation.

A chain conveyor 133 which forms part of a receiving unit (see the unit D of FIG. 1) serves to deliver arrays of, for example, twenty cigarettes each directly from the condensing funnel 134a of FIG. 11 to the turret of a packing machine. This chain conveyor 133 is shown in FIG. 12 and comprises an endless row of open-ended cells 132 articulately connected to each other by hinges 132a. The arrangement may, but need not, be such that a filled cell 132 is detached from an endless chain of the conveyor 133 and is reattached to the chain upon removal of its contents at the receiving station of a packing machine. The parts shown in FIG. 12 preferably consist of metallic material. However, it is equally possible to use conveyors which consist, at least in part, of synthetic plastic, vitreous or other suitable material. Mass-produced plastic components can be used with advantage to reduce the weight and/or cost. The expression "chain conveyor" is intended to embrace all such conveyors wherein the cells 132 are connected directly to each other, to a link chain, to a cable, to a plastic or textile or metallic band or a like carrier capable of transporting the cells in a desired path.

FIG. 13 shows th turret 186 of a conventional packing machine. This turret 186 forms part of a receiving unit (see the unit D of FIG. 1) and is provided with radially extending pockets or compartments 185 each of which can receive twenty cigarettes from the outlets of tubes shown in FIG. 10 or 11 or from a cell 132 shown in FIG. 12. The arrangement may be such that the open end of each empty compartment 185 is closed by a rectangular blank of paper, foil or other suitable wrapping material so that the blank is automatically draped around several sides of an array which is caused to penetrate into the compartment 185 with simultaneous deformation of the blank. It is clear that, instead of being admitted into the compartments 185, arrays of twenty cigarettes each can be delivered directly into the inlets or ducts of a different packing machine. All that counts is that arrays issuing from the outlets of pneumatic tubes 118 or 118' need not be destroyed prior to entry into a packing or other consuming or processing machine in a receiving unit so that the aforementioned chargers or trays may be dispensed with.

Referring now to FIG. 14, it will be seen that the arrays issuing from the outlets of pneumatic tubes can be admitted directly into prefabricated boxes or packs 251 which are transported sideways by a suitable chain conveyor 250 or the like. The conveyor 250 forms part of a receiving unit corresponding to the unit D of FIG. 1. The packs 251 may consist of one or more layers, for example, of an inner layer of metallic foil and an outer layer of paper, cardboard or plastic. If the packs 251 consist of plastic, the foils can be omitted because a plastic pack can form an airtight enclosure for cigarettes.

FIG. 15 illustrates an arraying apparatus which embodies the features described in connection with FIGS. 2–4, 10 and 12. Cigarettes 105 entering the inlets of twenty pneumatic tubes 118 through the openings of the guide member 116 reach the outlets 134 of tubes 118 to form arrays of twenty cigarettes each and each such array is admitted into one of the cells 132 on the chain conveyor 133. The drums 101–103 of the distributor unit are shown in developed form for the sake of clarity, i.e., in the same view as in FIG. 3. In actuality, the inlets of the tubes 118 are disposed along an arc so that each there of registers with one of the pockets 114 in the peripheral portion 113 of the stationary transfer drum 103. The outlets 134 of the shortest tubes 118G form the lowermost layer (see FIG. 10), the outlets 134 of six tubes 118H of medium length form the median layer, and the seven longest tubes 118J form the top layer. The curvature of tubes 118 is such that they cannot cause permanent deformation of and/or other damage to the cigarettes 105 during travel from the guide member 116 into the cells 132. A plate-like baffle or stop 135 is adjacent to the open ends of cells opposite the outlets 134 of tubes 118 to insure that each array of twenty cigarettes comes to a halt in a desired axial position with reference to the chain conveyor 133. The latter is advanced stepwise by a suitable indexing mechanism (not shown) so that an empty cell 132 registers with the outlets 134 whenever the tubes 118 discharge a fresh array of cigarettes.

It is equally possible to employ a chain conveyor which is advanced continuously, at a constant or at a variable speed. In such arraying apparatus, the tubes 118 consist, at least in part, of flexible material and their outlets 134 are connected with a suitable reciprocating device (not shown) which moves them with an empty cell 132 during transfer of an array of twenty cigarettes and which thereupon rapidly returns the outlets 134 to place them into registry with the next empty cell 132 prior to arrival of a fresh array.

The apparatus of FIG. 15 is preferably further provided with a suitable detecting device (not shown) which detects the absence of a cigarette in or upstream of a tube 118 at the time when such tube should contain a cigarette in order that the outlets 134 may furnish a complete array of twenty cigarettes. The detecting device can be combined with an inserting device which inserts a cigarette into each tube 118 which failed to receive a cigarette from the transfer drum 103. The detecting and inserting devices may be placed next to the tubes 118, next to the transfer drum 103, or next to the collector 101. For example, the detecting device can be associated with the collector 101 and the inserting device can feed cigarettes 105 into the pockets 114 of the transfer drum 103.

In the arraying apparatus of FIG. 15, the take-off belt 109, the producing machine which includes this belt, and the distributor unit which includes the drums 101–103 and the guide member 116 together form a feed which serves to supply articles 105 lengthwise to the inlets of the tubes 118, and the components 132, 133, 135 form part of a receiving unit which accepts arrays of rod-shaped articles from the outlets 134.

The apparatus of FIG. 16 comprises the parts shown in FIGS. 6, 10 and 13. The outlets 134 of pneumatic tubes 118 furnish arrays of twenty cigarettes each, and such arrays are accepted by successive compartments 185 of the turret 186. A rod cigarette machine 184, discharges cigarettes individually onto the take-off belt 109 which supplies cigarettes directly into the inlet of the distributor pipe 150 provided with two main orifices 154 for admission of air which conveys cigarettes into the inlets of the tubes 118 in a manner as described in connection with FIGS. 6, 7a, and 8. The belt 109 can be replaced by a channel or by a tubular feeding member. Also the turret 186 can be replaced by a chain conveyor 133 or by a conveyor 250 of the type shown in FIG. 14.

As shown in FIG. 17, the apparatus of our invention can receive and array cigarettes issuing from two or more producing machines. FIG. 17 shows twenty rod cigarette machines 184a–184t each of which furnishes cigarettes to one of twenty pneumatic tubes 118a′–118t′. The outlets 134′ of these tubes deliver arrays of cigarettes to a condensing funnel 134a which in turn delivers arrays into successive receptacles or packs 251 carried by a conveyor 250 in a manner as illustrated in greater detail in FIG. 14. Each of the cigarette machines 184a–184t supplies cigarettes to one of twenty endless take-off belts 109a–109t and the inlet of each pneumatic tube 118a′–118t′ is provided with two main orifices 154a–154t. The cigarettes are shown at 105. Of course, the conveyor 250 of FIG. 17 can be replaced by the conveyor 133 or turret 186 without departing from the spirit of our invention. In this illustration, the producing machines 184a–184t and their belts 109a–109t perform the functions of the machine A and distributor unit B shown in FIG. 1. The distributor tube 150 of FIGS. 6–9 is dispensed with; therefore, each pneumatic tube 118a′–118t′ is provided with a pair of main orifices 154a–154t which admit jets of air serving to advance cigarettes 105 toward and beyond the outlets 134′. The receiving unit of FIG. 17 includes the conveyor 250.

Referring finally to FIGS. 18 and 19, there is shown a further apparatus wherein the rotary collector 101 of FIG. 3 is replaced by a collector in the form of a suction head or lifter 1137 which is similar to lifters disclosed in U.S. Pat. No. 3,190,459 granted to Kochalski et al. The suction head 1137 receives cigaretes 1105 which are delivered sideways and are randomly spaced from each other on the upper stringer of a supply belt 1136. The underside of the suction head 1137 comprises a series of coplanar portions provided with grooves or flutes 1138 each of which is connected with a suction chamber 1137a. The latter is connected with a suction fan, not shown. The arrangement is such that cigarettes 1105 advancing with the upper run of the article supplying belt 1136 (arrow 1136a) travel sideways below the suction head 1137 until the foremost cigarette reaches the foremost flute 1138. This foremost cigarette is then lifted into the foremost flute 1138 whereby the suction in the next-following flute 1138 increases so that the suction head 1137 lifts the next-following cigarette. The same procedure is repeated until the suction head 1137 accumulates a requisite number of cigarettes 1105.

The apparatus of FIGS. 18 and 19 further comprises an ejector or transfer member in the form of a plate-like pusher 1139 which is reciprocable by a fluid-actuated (preferably pneumatic) single-acting unit including a cylinder 1140 and a piston rod 1141 reciprocable in directions indicated by arrow 1141a. A return spring 1143 tends to maintain the piston rod 1141 in retracted position. The chamber 1140a of the cylinder 1140 can receive compressed air through a regulating valve 1142 which is a solenoid valve, the solenoid being shown at 1142a. The function of the plunger 1139 is to expel a row or layer of cigarettes 1105 from the flutes 1138 of the suction head 1137 and to deliver such cigarettes into the inlets of pneumatic tubes 1118. The inlets of the tubes 1118 are coplanar.

The solenoid 1142a is connected with a vacuum switch 1142b through the intermediary of a microswitch 1114. The microswitch 1114 can be actuated by a trip 1145 of the plunger 1139. The vacuum switch 1142b will produce a signal when the suction in chamber 1137a rises in response to entry of a cigarette into the last or rearmost flute 1138. Each of these flutes is connected with the suction chamber 1137a by means of a duct and the ducts are sealed in response to entry of cigarettes into the respective flutes. Thus, the suction in chamber 1137a increases progressively in response to accumulation of cigarettes 1105 at the underside of the suction head 1137.

The microswitch 1114 and trip 1145 can be replaced by a contactless signal generator whose function is to open the circuit of the solenoid 1142a when the plunger 1139 completes a working stroke so that the flutes 1138 of the suction head 1137 are empty. The vacuum switch 1142b also opens so that the microswitch 1114 can close again without, however, completing the circuit of the solenoid 1142a. For example, the microswitch 1114 and trip 1145 can be replaced by a light-sensitive device or by an initiator of the type described in connection with FIG. 5.

The numeral 1146 denotes a guide member which corresponds to the guide member 116 of FIG. 3 and serves to direct cigarettes 1105 into the inlets of the tubes 1118. The guide member 1146 can be provided with channels or with open-ended bores or holes.

The plunger 1139 is formed with a series of orifices 1147 which can be connected to a compressor 1148 or another suitable source of compressed air. The connection comprises a flexible conduit or hose 1150 and a fixed conduit 1150a. The conduits 1150, 1150a are connected to each other by an interrupter valve 1149 which is a solenoid valve and is connected with the microswitch 1114. The latter effects energization of the solenoid in the valve 1149 when the plunger 1139 reaches its foremost position (when the trip 1145 reaches the microswitch 1114) so that the conduits 1150, 1150a then admit to orifices 1147 jets of compressed air which expels cigarettes 1105 from the flutes 1138 and through the guide member 1146 so that such cigarettes enter the inlets of the respective tubes 1118.

The operation is as follows:

The belt 1136 supplies cigarettes from a producing machine, for example, from a filter cigarette machine, and such cigarettes enter successive flutes 1138 of the suction head 1137. When the last flute 1138 receives a cigarette, the suction in chamber 1137a rises and the vacuum switch 1142b completes the circuit of the solenoid 1142a through the microswitch 1114. The valve 1142 then admits compressed air from a conduit 1150b which branches from the conduit 1150a, and such air flows into the chamber 1140a of the cylinder 1140 so that the piston rod 1141 moves in a direction to the right and causes the plunger 1139 to perform a working stroke whereby the leading edge of the plunger transfers an entire row of cigarettes from the flutes 1138 into the guide member 1146. When the plunger 1139 reaches the forward end of its stroke, the trip 1145 strikes against the microswitch 1114 and the latter opens the circuit of the solenoid 1142a whereby the valve member of the valve 1142 seals the conduit 1150b from the chamber 1140a and connects this chamber with the atmosphere. The spring 1143 is free to return the plunger 1139 and the piston rod 1141 to starting position. When the microswitch 1114 is engaged by the trip 1145, the valve 1149 admits compressed air from the conduit 1150a into the conduit 1150 whereby the orifices 1147 discharge jets of compressed air which transfer cigarettes 1105 from the guide member 1146 into the inlets of the tubes 1118.

The guide member 1146 can be assembled of a series of short pipes each of which is connected with one of the tubes 1118. In such apparatus, the admission of air which expels cigarettes 1105 from the guide member need not take place through orifices in the plunger 1139, i.e., air can be admitted directly into the pipes of the guide member. It is equally clear that the transfer of cigarettes 1105 from the flutes 1138 of the station head 1137 into the inlets of the tubes 1118 can be effected by suction. The tubes 1118 are then connected with a suction generating device which draws cigarettes from the flutes 1138 or from the openings or bores of the guide member 1146.

In the apparatus of FIGS. 18 and 19, all of the illustrated elements with the exception of tubes 1118 form part of a feed which supplies cigarettes 1105 to the inlets of the tubes 1118. The suction head 1137 is analogous to the collector 101 of FIG. 3; however, the take-off belt 109 and drum 102 of FIG. 3 are replaced by the belt 1136 which delivers cigarettes 1105 sideways.

In order to avoid jamming of the apparatus by piles of cigarettes, the operating cycle is preferably selected in such a way that the cigarettes which are to leave the outlets of pneumatic tubes (for example, the outlets 134 of the tubes 118 shown in FIG. 10) reach such ends at timely spaced intervals rather than at the same time. Thus, and referring to FIG. 10, cigarettes forming the lowermost layer which issues from the outlets 134 of the tubes 118G can reach the respective outlets slightly ahead of cigarettes which issue from tubes 118H and/or 118J. This can be readily achieved by conveying the cigarettes at identical speeds but in paths of different length. As described in connection with FIG. 15, the length of tubes 118G is less than the length of tubes 118H, and the tubes 118H are shorter than the tubes 118J. Alternatively, the cigarettes can be conveyed through tubes of identical length if the strength of jets of air which are used to convey the cigarettes varies from tube to tube or from group to group of such tubes. For example, cigarettes which are to form the lowermost layer of an array of twenty cigarettes can be conveyed by strongest jets of air, the cigarettes of the median layer by somewhat weaker jets, and the cigarettes of the uppeurmost layer by weakest jets. The two solutions (tubes of different length and air jets of different strength) can be combined in a single apparatus. The strength of jets can be regulated in a very simple way by throttling the flow of air in selected tubes and by utilizing throttling passages of different or variable cross-sectional area. Still further, the tubes can be provided with slots which are exposed when the cigarettes advance beyond such slots so that some air will escape from the tube and will be less effective to accelerate the respective cigarette. The number and the combined cross-sectional area of slots in a tube will determine the speed at which the cigarette is advanced through the tube.

When a layer or a complete array approaches the outlets of a set of tubes, the cigarettes of the layer of array are preferably braked to prevent excessive impact of cigarettes against baffles (see the baffle 135 in FIG. 15) or against the bottom walls of receptacles or packs (see the receptacles 251 in FIG. 14). Such impact could cause deformation of cigarettes and/or excessive losses of tobacco particles. The braking action is preferably carried out by resorting to compressed air or to suction. It is also possible to combine both methods and to thus insure gradual and predictable deceleration of ciagrettes. Articles which can be electrostatically charged may be braked by resorting to electrostatic forces. Electrostatic charges may be produced by installing in pneumatic tubes inserts of suitable plastic material, i.e., of a material which is electrostatically charged in response to passage of cigarettes therealong. The braking effect can be improved by connecting such inserts with outside sources of electrical energy.

If the pneumatic tubes consist of flexible material, their inlets and/or outlets can be caused to change positions so that the tubes can be disconnected from a first producing or consuming machine to be connected to one or more other producing or consuming machines without necessitating my shifting of such machines. Also, and referring again to FIG. 17, if the tubes 118a'–118t' are flexible, they can be readily assembled into two or more groups each of which is connected to a single cigarette machine 184 or to a set of producing machines whose number is less than the number of tubes in a group. The ends of the tubes may be provided with suitable adapters or nipples so that they may be readily coupled to or detached from producing or consuming machines.

Certain important advantages of our method and apparatus can be summarized as follows:

The transfer of cigarettes or like rod-shaped articles from one or more producing machines to one or more consuming or processing machines can be carried out in a small area and by resorting to a relatively small number of simple parts. Also, the articles are less likely to be smudged, deformed or otherwise damaged because they are immediately assembled in arrays which are required in the consuming or processing machines. Of course, each final array can be assembled of two or more smaller arrays in a manner as described in connection with FIG. 10 wherein the three layers of cigarettes can reach the outlets of the respective tubes 118 at timely spaced intervals. The transfer of articles from producing to consuming or processing machines takes up less time because the time required for filling, transportation and evacuation of chargers or trays can be used for assembly of additional arrays. The quality of articles in the arrays is superior to the quality of articles which are arrayed upon removal from trays because the transfer into and evacuation of articles from trays will be often accompanied by loss of tobacco particles, tearing of cigarette paper or other damage to the articles. The likelihood of damage or deformation is particularly remote if the arrays are fed directly into receptacles in a manner as described in connection with FIG. 14 or directly into the compartments of a part of a processing machine, such as the turret 186 of FIG. 13. This turret can rotate slowly and its speed can be controlled by a simple programming system, even if the packing machine is to receive the output of two or more producing machines.

Additional savings in time and equipment can be achieved if the cigarettes or like rod-shaped articles need not change direction all the way from the discharge end of a producing machine to the intake of a consuming machine. This is shown in FIG. 16 wherein the cigarettes travel substantially axially or lengthwise all the way from the producing machine 184 to the turret 186 of the packing machine. The same holds true for the apparatus of FIG. 17 wherein the cigarettes advance only lengthwise. This is desirable because the apparatus must be equipped with braking or arresting means if the cigarettes are to change there direction of movement from lengthwise to sidewise travel or vice versa, particularly if the cigarettes travel at a very high speed. The apparatus of FIG. 17 constitutes a simplified version of the apparatus shown in FIG. 16 in that it can form arrays of cigarettes without resorting to switching devices.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. Apparatus for assembling cigarettes or like rod-shaped articles in arrays which are thereupon maintained at least during introduction of such articles into packs or analogous receptacles, comprising a plurality of pneumatic tubes having article-receiving inlets and outlets grouped to discharge successively at least one array of articles at a time; a feed for supplying articles lengthwise into said inlets; and means for accepting arrays of articles from said outlets and for packing such arrays of articles into packs without substantial changes in the positions of respective articles with reference to each other.

2. Apparatus as defined in claim 1, wherein said feed comprises at least one article producing machine and at least one distributor unit for delivering articles produced by said machine to said inlets.

3. Apparatus as defined in claim 2, wherein said distributor unit comprises a rotary collecting member having portions movable into and from registry with said inlets, means for supplying articles from the producing machine to said portions, and means for transferring articles from said portions lengthwise into said inlets.

4. Apparatus as defined in claim 3, wherein said portions of the collecting member are provided with flutes and further comprising braking means for arresting the articles on entry into such flutes.

5. Apparatus as defined in claim 4, wherein said transferring means comprises a fixed transfer member having pockets registering with said inlets, said flutes being movable into and from registry with said pockets.

6. Apparatus as defined in claim 3, wherein the means for supplying articles from said machine to said portions of the collecting member comprises a fixed feed member having orifices registering with said inlets, said inlets and said orifices being disposed at the opposite ends of said collecting member, said means for transferring articles from said portions of the collecting member into said inlets comprising means for supplying compressed gas to said orifices whereby the jets issuing from said orifices expel articles from said portions of the collecting member into said inlets, and valve means for timing the admission of gas to said orifices.

7. Apparatus as defined in claim 6, wherein said gas supplying means comprises a supply conduit having a pair of spaced sections and said valve means comprises a valve member movable in synchronism with said collecting member and having a portion extending between said sections, said portion being provided with at least one aperture which permits flow of gas to said orifices when located between said sections.

8. Apparatus as defined in claim 6, wherein said valve means is operative to admit gas to said orifices in response to predetermined angular displacements of said collecting member.

9. Apparatus as defined in claim 6, further comprising counter means arranged to count the number of articles supplied to said collecting member and to open said valve means when the number of thus counted articles suffices to form an array.

10. Apparatus as defined in claim 1, wherein said feed comprises a tubular distributor connected with said inlets, switching devices provided at the junctions of said distributor with said inlets, and means for supplying articles to said distributor.

11. Apparatus as defined in claim 10, wherein the operation of said distributor and said switching devices is based on the Coanda effect.

12. Apparatus as defined in claim 11, wherein each of said switching devices comprises a bistable pneumatic control element and control nozzles connected with said control element and installed at the respective junction.

13. Apparatus as defined in claim 11, wherein each of said switching devices comprises an electropneumatic bistable control element and control nozzles connected with said control element and installed at the respective junction.

14. Apparatus as defined in claim 13, wherein each of said switching devices further comprises signal generating means each installed in one of said tubes to operate another control element in response to detection of an article in said one tube.

15. Apparatus as defined in claim 1, wherein said receiving means comprises condensing means through which the arrays issuing from said outlets pass.

16. Apparatus as defined in claim 1, wherein the wall thickness of at least some of said outlets decreases in a direction away from the respective inlets.

17. Apparatus as defined in claim 1, wherein said receiving means comprises a conveyor having a plurality of open-ended cells movable into registry with said outlets to receive said arrays.

18. Apparatus as defined in claim 1, wherein said receiving means comprises a conveyor for a series of prefabricated receptacles movable into registry with said outlets to receive said arrays.

19. Apparatus as defined in claim 1, wherein said feed comprises collector means having coplanar portions in registry with said inlets, means for supplying articles to said coplanar portions, and means for transferring articles from said coplanar portions into the respective inlets.

20. Apparatus as defined in claim 19, wherein said supplying means is arranged to deliver articles sideways.

21. Apparatus as defined in claim 20, wherein said portions of said collector means are provided with flutes and wherein said collector means comprises means for retaining articles in said flutes by suction.

22. Apparatus as defined in claim 19, wherein said transferring means comprises means for moving articles lengthwise by jets of compressed gas.

23. Apparatus as defined in claim 1, wherein said feed comprises an article producing machine for each of said inlets.

24. Apparatus as defined in claim 1, wherein said feed comprises at least one cigarette making machine and said receiving means comprises at least one cigarette packing machine.

References Cited

UNITED STATES PATENTS

| | | | |
|---|---|---|---|
| 2,093,437 | 9/1937 | Gwinn | 302—2 |
| 2,993,737 | 7/1961 | Stephen | 302—2 |
| 3,058,275 | 10/1962 | Horgan | 53—192 X |
| 3,062,588 | 11/1962 | Molins et al. | 302—2 |
| 3,189,178 | 6/1965 | Calleson et al. | 302—2 X |
| 3,190,459 | 6/1965 | Kochalski et al. | 53—236 X |
| 3,279,145 | 10/1966 | Williamson | 53—236 X |
| 3,398,750 | 8/1968 | Chambers et al. | 131—25 |
| 3,222,110 | 12/1965 | Kelley et al. | 302—2 |

THERON E. CONDON, Primary Examiner

R. L. SPRUILL, Assistant Examiner

U.S. Cl. X.R.

53—148, 236; 131—25; 302—2